No. 722,020. PATENTED MAR. 3, 1903.
A. F. HOFFMAN.
CALENDAR.
APPLICATION FILED DEC. 20, 1902.
NO MODEL.
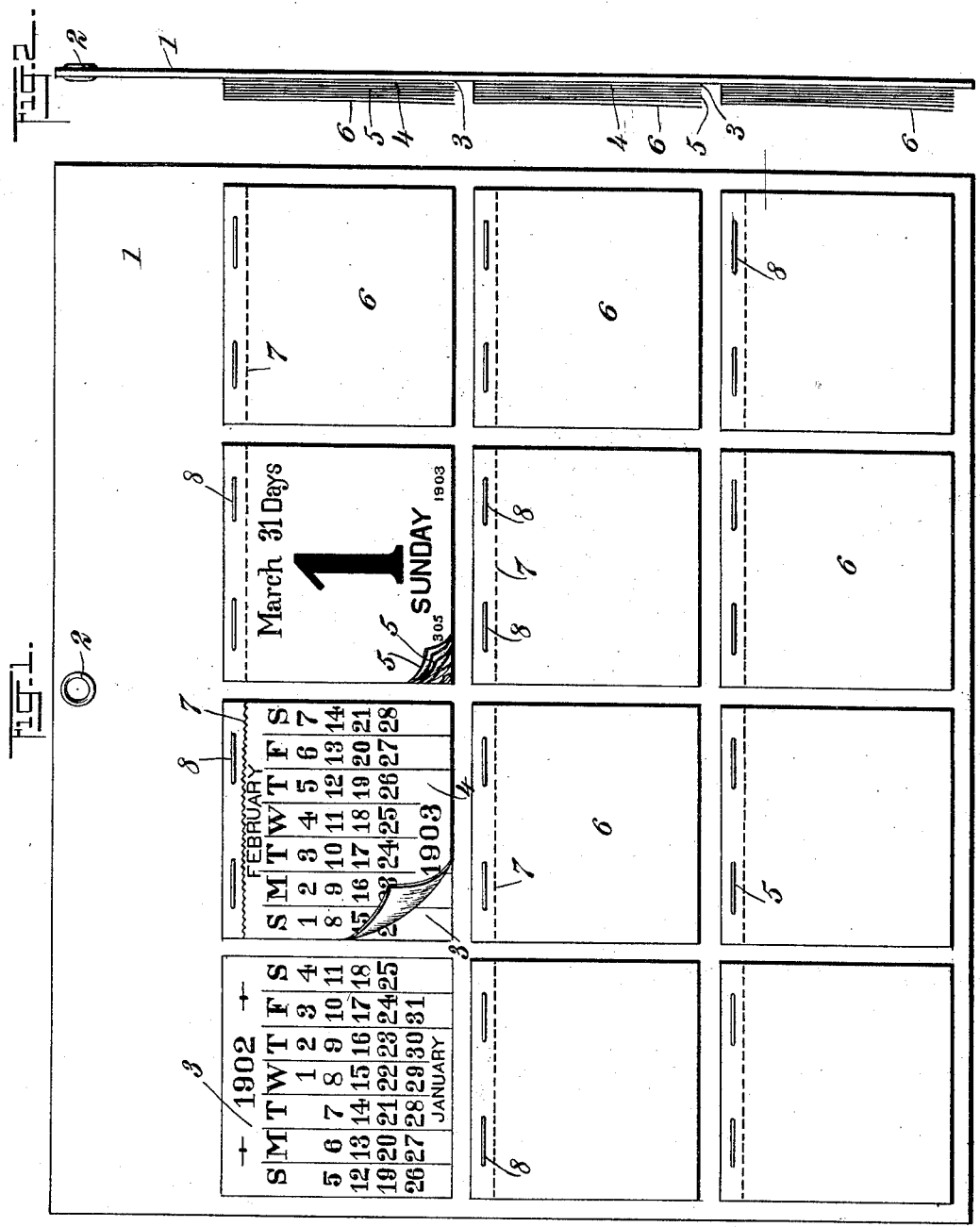
WITNESSES:
Julius H. Luth
W. Harrison
INVENTOR
Auguste F. Hoffman
BY Munn
ATTORNEYS.

UNITED STATES PATENT OFFICE.

AUGUSTE F. HOFFMAN, OF NEW YORK, N. Y.

CALENDAR.

SPECIFICATION forming part of Letters Patent No. 722,020, dated March 3, 1903.

Application filed December 20, 1902. Serial No. 136,018. (No model.)

*To all whom it may concern:*

Be it known that I, AUGUSTE F. HOFFMAN, a citizen of the United States, and a resident of the city of New York, borough of Manhattan, in the county and State of New York, have invented a new and Improved Calendar, of which the following is a full, clear, and exact description.

My invention relates to calendars, my more particular object being to produce a neat, simple, and efficient calendar which will indicate comparative dates for different years and subdivisions thereof.

Reference is to be had to the accompanying drawings, forming a part of this specification, in which similar characters of reference indicate corresponding parts in both figures.

Figure 1 is a front elevation of my calendar, and Fig. 2 is a side elevation thereof.

A board 1 is provided with an eyelet 2, whereby the board may be suspended. The board is further provided with rectangular spaces 3, each bearing numerals or other marks representing the days and weeks of a month of a particular year—say 1902.

The leaves 4, detachable by means of the weakened lines 7, are secured upon the board by means of the fastenings 8. Each leaf represents a corresponding month of the current year—say 1903. Superposed upon each leaf 4 is a group of detachable leaves 5, normally held in place by the same fastenings 8 and likewise provided with weakened lines 7. Each of the leaves 5 represents a separate day of a month. Superposed upon the leaves 5 are blank leaves 6 for the purpose of concealing future dates, and thereby avoiding confusion which might otherwise be due to the exhibit of a date in future.

My invention is used as follows: Assuming that all of the leaves are in place, the blank leaves 6, the several leaves 5, representing the successive days of the current month, and the leaves 4 are removed in succession. The removal of each leaf 5 exhibits a mark representing the day following the day just past. When the last leaf of each month is removed, the table for the entire month is shown, as at 4, and by removing the leaf 4 the table for the corresponding month of another year—say of the year just past—is exhibited.

My calendar is of a peculiar value in cases where it is desirable to make a comparison between a date occurring in one year and a corresponding date occurring in the year just past. Of course, if desired, the groups 3 of distinguishing-marks may refer to any other year independently of the one just past.

Having thus described my invention, I claim as new and desire to secure by Letters Patent—

1. A calendar, comprising a board provided with distinguishing-marks representing days of different months, said marks being divided into distinct groups representing the respective months of a particular year, a detachable leaf covering each group and provided with numerals representing the days of the corresponding month of some other year, and a plurality of detachable leaves superposed upon each of said leaves above mentioned and representing separately the individual days of each month of said other year.

2. A calendar, comprising a board provided with distinguishing-marks arranged in groups representing respectively the months of a particular year, each group representing the several days of a month of said year, a detachable leaf covering each of said groups and provided with distinguishing-marks representing the days of a coresponding month of some other year, and a plurality of other detachable leaves superposed upon each of said leaves and representing the several days of each month of said other year.

In testimony whereof I have signed my name to this specification in the presence of two subscribing witnesses.

AUGUSTE F. HOFFMAN.

Witnesses:
WALTON HARRISON,
EVERARD BOLTON MARSHALL.